United States Patent
Hutchins et al.

(10) Patent No.: US 7,268,786 B2
(45) Date of Patent: Sep. 11, 2007

(54) RECONFIGURABLE PIPELINE FOR LOW POWER PROGRAMMABLE PROCESSOR

(75) Inventors: Edward A. Hutchins, Mountain View, CA (US); Brian K. Angell, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 354 days.

(21) Appl. No.: 10/846,226

(22) Filed: May 14, 2004

(65) Prior Publication Data

US 2005/0253857 A1   Nov. 17, 2005

(51) Int. Cl.
*G06T 1/00* (2006.01)
*G06F 15/16* (2006.01)
*G09G 5/37* (2006.01)

(52) U.S. Cl. .................... 345/522; 345/502; 345/561

(58) Field of Classification Search ........... 345/502, 345/582, 561, 522; 711/202; 370/389, 469
See application file for complete search history.

(56) References Cited

U.S. PATENT DOCUMENTS

| | | | |
|---|---|---|---|
| 4,816,913 A | | 3/1989 | Harney et al. |
| 5,230,039 A | * | 7/1993 | Grossman et al. .......... 345/582 |
| 5,526,502 A | * | 6/1996 | Yoshida et al. ............. 711/202 |
| 5,669,010 A | * | 9/1997 | Duluk, Jr. .................... 712/22 |
| 5,778,250 A | * | 7/1998 | Dye ............................ 712/32 |
| 6,025,854 A | | 2/2000 | Hinz et al. |
| 6,516,032 B1 | | 2/2003 | Heirich et al. |

* cited by examiner

*Primary Examiner*—Kee M. Tung
*Assistant Examiner*—Hau Nguyen
(74) *Attorney, Agent, or Firm*—Cooley Godward Kronish LLP

(57) ABSTRACT

A graphics processor has elements of a graphics pipeline coupled by distributors. The distributors permit the process flow of pixel packets through the pipeline to be reconfigured in response to a command from a host.

6 Claims, 11 Drawing Sheets

RECONFIGURABLE PIPELINE FOR LOW POWER PROGRAMMABLE PROCESSOR

FIELD OF THE INVENTION

The present invention is generally related to programmable processors. More particularly, the present invention is directed towards low power programmable processors for graphics applications.

BACKGROUND OF THE INVENTION

The generation of three-dimensional graphical images is of interest in a variety of electronic games and other applications. Conventionally, some of the steps used to create a three-dimensional image of a scene include generating a three-dimensional model of objects to be displayed. Geometrical primitives (e.g., triangles) are formed which are mapped to a two-dimensional projection along with depth information. Rendering (drawing) primitives includes interpolating parameters, such as depth and color, over each two-dimensional projection of a primitive.

Graphics Processing Units (GPUs) are commonly used in graphics systems to generate three-dimensional images in response to instructions from a central processing unit. Modern GPUs typically utilize a graphics pipeline for processing data. FIG. 1 is a prior art drawing of a traditional pipeline architecture which is a "deep" pipeline having stages dedicated to performing specific functions. A transform stage 105 performs geometrical calculations of primitives and may also perform a clipping operation. A setup/raster stage 110 rasterizes the primitives. A texture address 115 and texture fetch 120 stage are utilized for texture mapping. A fog stage 130 implements a fog algorithm. An alpha test stage 135 performs an alpha test. A depth test 140 performs a depth test for culling occluded pixels. An alpha blend stage 145 performs an alpha blend color combination algorithm. A memory write stage 150 writes the output of the pipeline.

The traditional GPU pipeline architecture illustrated in FIG. 1 is typically optimized for fast texturing using the OpenGL™ graphics language. A benefit of a deep pipeline architecture is that it permits fast, high quality rendering of even complex scenes.

There is an increasing interest in utilizing three-dimensional graphics in wireless phones, personal digital assistants (PDAs), and other devices where cost and power consumption are important design requirements. However, the traditional deep pipeline architecture requires a significant chip area, resulting in greater cost than desired. Additionally, a deep pipeline consumes significant power, even if the stages are performing comparatively little processing. This is because many of the stages consume about the same amount of power regardless of whether they are processing pixels.

As a result of cost and power considerations, the conventional deep pipeline architecture illustrated in FIG. 1 is unsuitable for many graphics applications, such as implementing three-dimensional games on wireless phones and PDAs.

Therefore, what is desired is a processor architecture suitable for graphics processing applications but with reduced power and size requirements.

SUMMARY OF THE INVENTION

A graphics processor has elements of a graphics pipeline coupled by distributors. The distributors permit the process flow of pixel packets through the pipeline to be reconfigured in response to a command from a host.

In one embodiment of an apparatus, a graphics pipeline includes a plurality of stages. A first distributor is coupled to respective inputs of the plurality of stages. A second distributor is coupled to respective outputs of the plurality of stages. The first distributor and the second distributor are adapted for reconfiguring a process flow of pixel packets through the plurality of stages in response to a command from a host.

In one embodiment of a method, a command is received from a software host to reconfigure a process flow of pixel packets through elements of a graphics pipeline. In response, at least one distributor is adjusted to reconfigure the pipeline from a first processing flow to a second processing flow.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
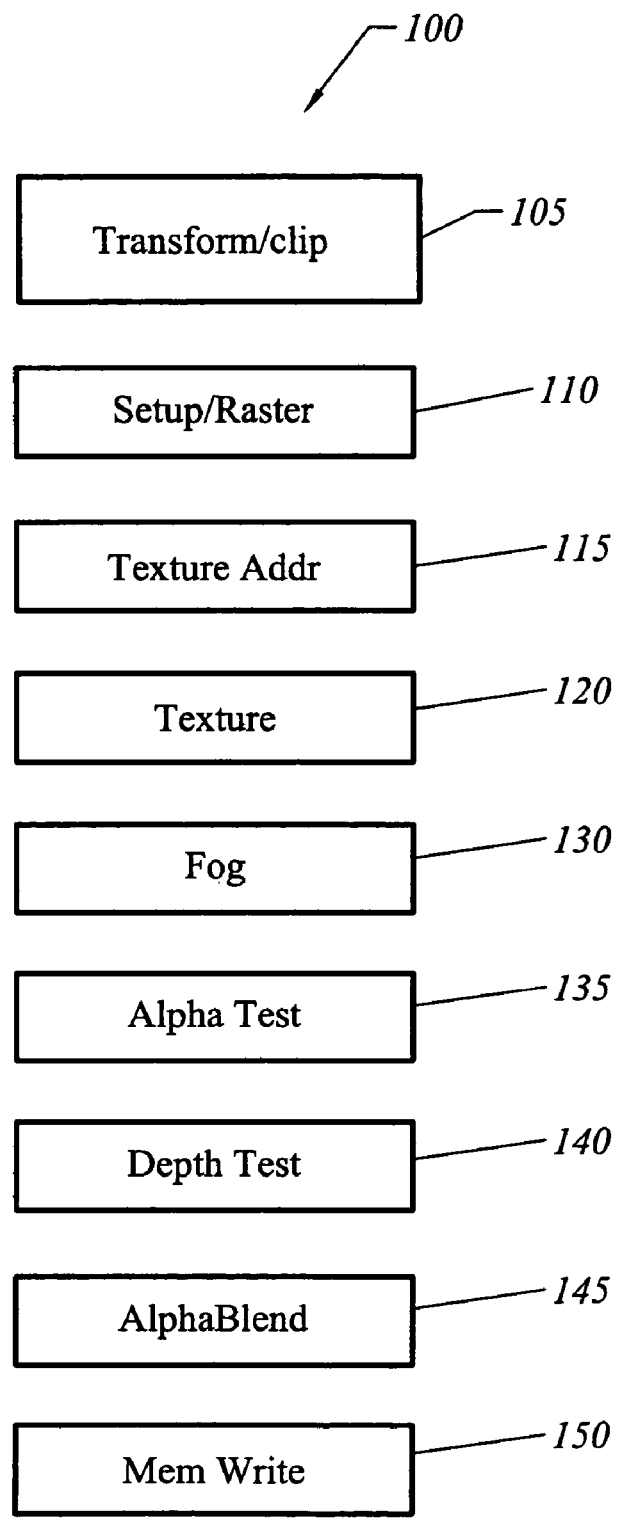
FIG. 1 is a diagram of a prior art pipeline for three-dimensional graphics.
Figure 2:
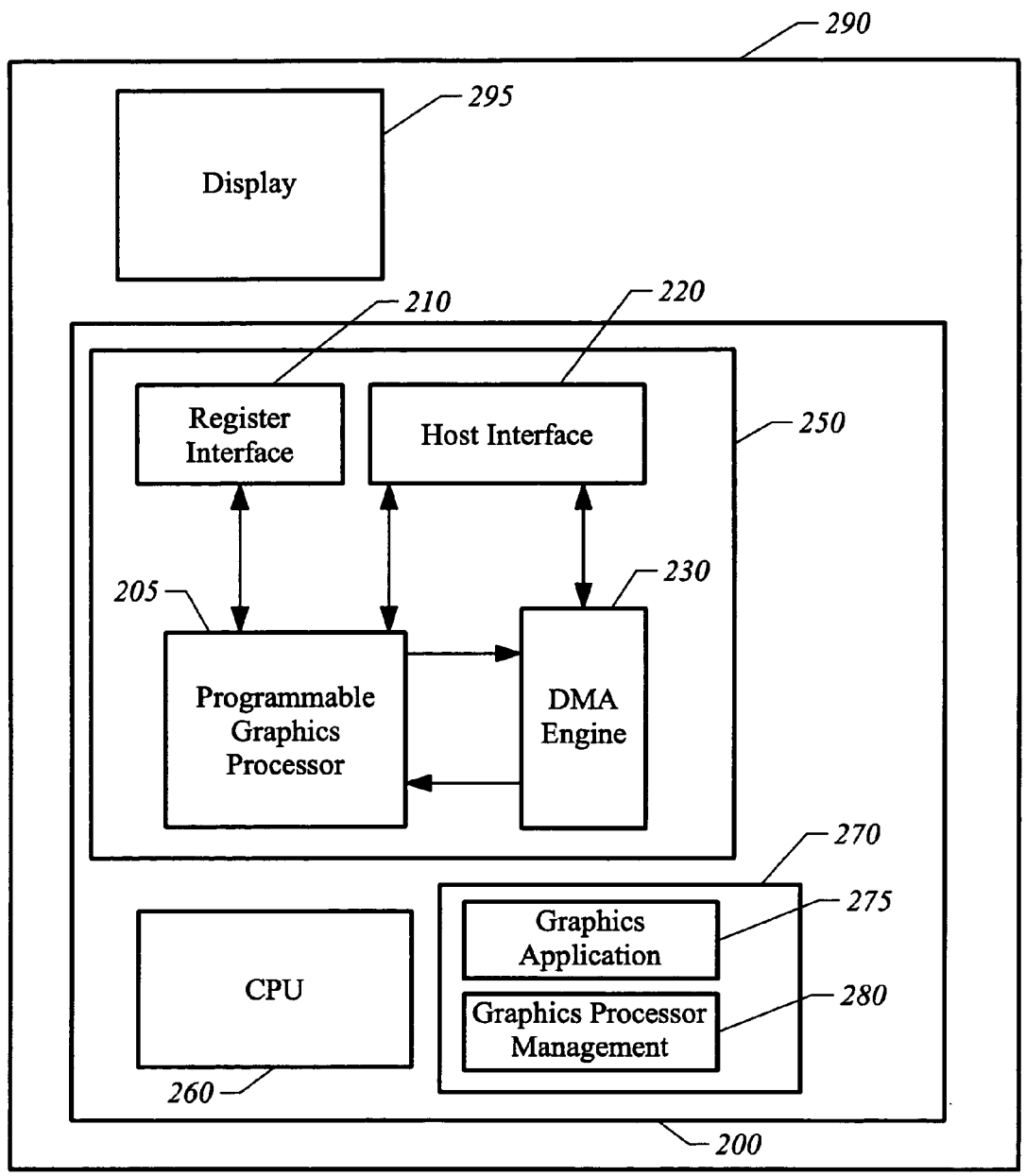
FIG. 2 is a block diagram of an integrated circuit including a programmable graphics processor in accordance with one embodiment of the present invention.

FIG. 2 is a block diagram of one embodiment of the present invention. A programmable graphics processor 205 is coupled to a register interface 210, a host interface 220, and a memory interface, such as a direct memory access (DMA) engine 230 for memory read/write operations with a graphics memory (not shown), such as a frame buffer. Host interface 220 permits programmable graphics processor 205 to receive commands for generating graphical images from a host. For example, the host may send vertex data, commands and program instructions to programmable graphics processor 205. A memory interface, such as a DMA engine 230, permits read/write operations to be performed with a graphics memory (not shown). Register interface 210 provides an interface for interfacing with registers of programmable graphics processor 205.

Programmable graphics processor 205 may be implemented as part of a system 290 that includes at least one other central processing unit 260 executing a software application 270 that acts as the host for programmable graphics processor 205. An exemplary system 290 may, for example, comprise a handheld unit, such as a cell phone or personal digital assistant (PDA). For example, software application 270 may include a graphics application 275 for generating graphical images on a display 295. Additionally, as described below in more detail, in some embodiments software application 270 may include a graphics processor management software application 280 for performing management functions associated with programmable graphics processor 205, such as for example, pipeline re-configuration, register configuration, and testing.

In one embodiment, programmable graphics processor 205, register interface 210, host interface 220, and DMA engine 230 are part of an embedded graphics processing core 250 formed on a single integrated circuit 200 which includes a host, such as an integrated circuit 200 formed on a chip including a central processing unit 260 having software 270 resident on a memory. Alternatively, graphics processing core 250 may be disposed on a first integrated circuit and CPU 260 disposed on a second integrated circuit.

Figure 3:
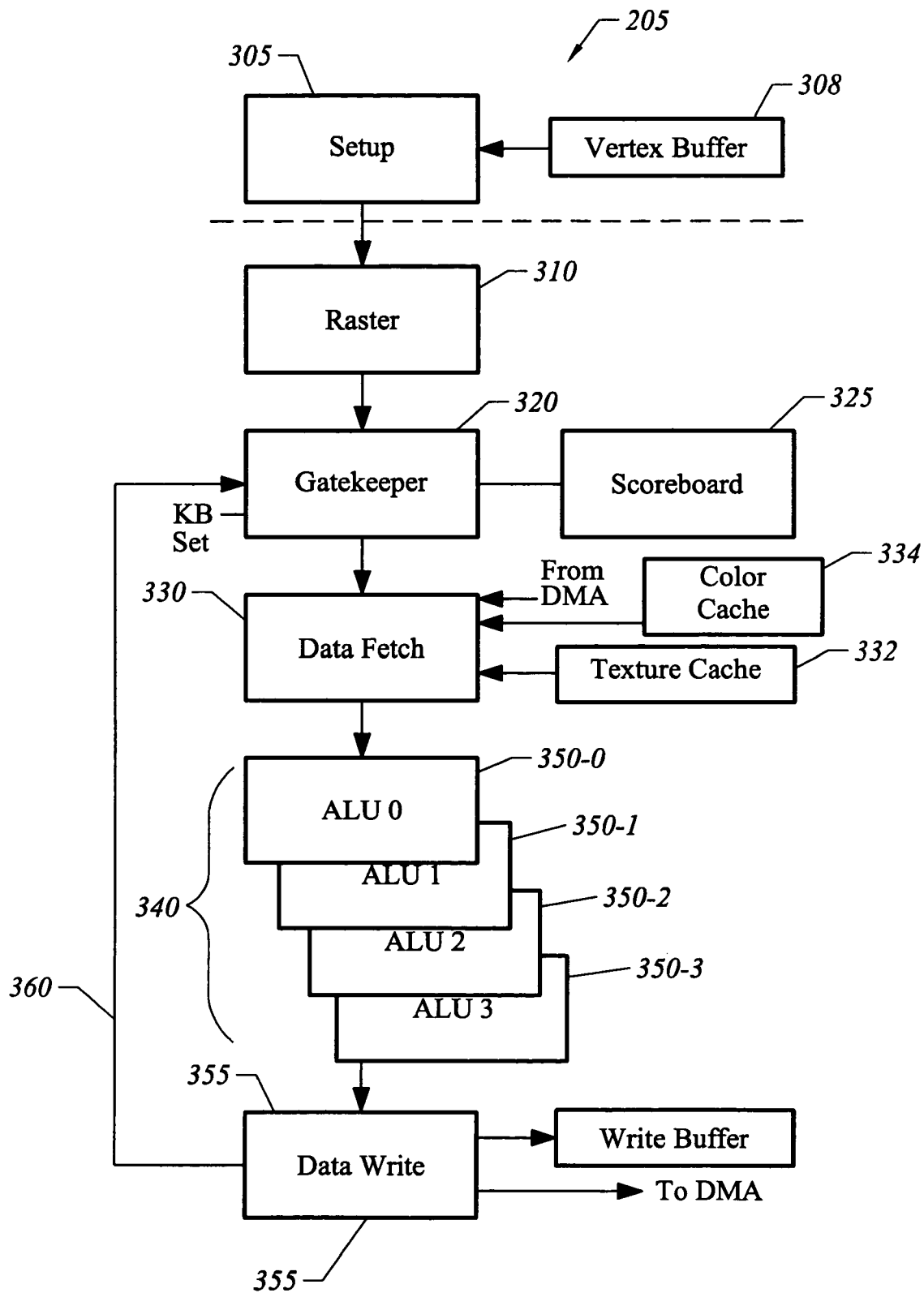
FIG. 3 is a block diagram of a programmable graphics processor in accordance with one embodiment of the present invention.

FIG. 3 is a block diagram illustrating in more detail a programmable graphics processor 205 in accordance with one embodiment of the present invention. It includes a setup stage 305, a raster stage 310, a gatekeeper stage 320, a data fetch stage 330, Arithmetic Logic Unit (ALU) stage 340, a data write stage 355, and a recirculation path 360. In one embodiment, programmable graphics processor 205 includes ALUs 350 configured to execute a shader program to implement three-dimensional graphics operations such as a texture combine, fog, alpha blend (e.g., color blending), alpha test (e.g., color test), Z depth test, or other shading algorithms. However, it will be understood throughout the following discussion that programmable graphics processor 205 may also be configured to perform other types of processing operations.

A setup stage 305 receives instructions from a host, such as a software application running on integrated circuit 200. In one embodiment, setup stage 305 performs the functions of geometrical transformation of coordinates (X-form), clipping, and setup. The setup unit takes vertex information (e.g., x, y, z, color and/or texture attributes) and applies a user defined view transform to calculate screen space coordinates for each geometrical primitive (hereinafter described as triangles because primitives are typically implemented as triangles), which is then sent to the raster stage 310 to draw the given triangle. A vertex buffer 308 may be included to provide a buffer for vertex data used by setup stage 305. In one embodiment, setup stage 305 sets up barycentric coefficients. In one implementation, setup stage 305 is a floating point Very Large Instruction Word (VLIW) machine that supports 32-bit IEEE floating point, S15.16 fixed point and packed 0.8 formats.

Raster stage 310 receives data from setup stage 205 regarding triangles that are to be rendered (e.g., converted into pixels). In some embodiments, an instruction RAM (not shown) may, for example, be included in raster stage 310 for programming instructions for raster stage 310. Raster stage 310 processes each pixel of a given triangle and determines parameters that need to be calculated for a pixel as part of rendering, such as calculating color, texture, alpha-test, alpha-blend, z-depth test, and fog parameters. In one embodiment, raster stage 310 calculates barycentric coefficients for pixel packets. In a barycentric coordinate system, distances in a triangle are measured with respect to its vertices. The use of barycentric coefficients reduces the required dynamic range, which permits using fixed-point calculations that require less power than floating point calculations.

Raster stage 310 generates at least one pixel packet for each pixel of a triangle that is to be processed. Each pixel packet includes fields for a payload of pixel attributes required for processing (e.g., color, texture, depth, fog, (x,y) location). Additionally, each pixel packet has associated sideband information including an instruction sequence of operations to be performed on the pixel packet. An instruction area in raster stage 210 (not shown) assigns instructions to pixel packets.

Figure 4:
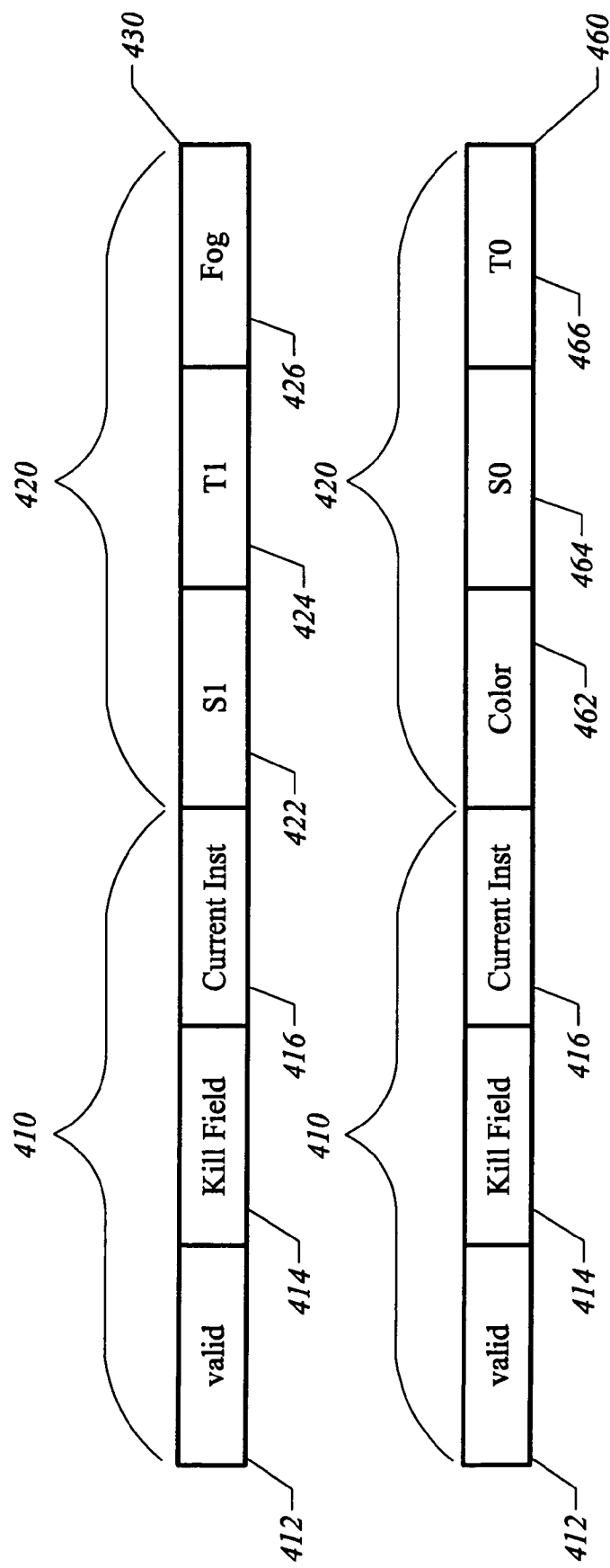
FIG. 4 illustrates exemplary pixel packets in accordance with one embodiment of the present invention.

FIG. 4 illustrates exemplary pixel packets 430 and 460 for one pixel. In one embodiment raster stage 210 partitions pixel attributes into two or more different types of pixel packets 430 and 460, with each type of pixel packet requiring fields only for pixel attribute data that a particular type of instruction acts on. Partitioning pixel data into smaller units of work reduces bandwidth requirements and also reduces the processing requirements if, for example, only a subset of attributes of a pixel need to be operated on for a particular processing operation.

Each pixel packet has associated sideband information 410 and payload information 420. Exemplary sideband information includes a valid field 412, kill field 414, tag field, and an instruction field 416 that includes a current instruction. Exemplary pixel packet 430 includes a first set of (s,t) texture coordinates 422 and 424 fields along with a fog field 426. Exemplary pixel packet 460 includes a color field 462, and a second set of a texture coordinates (s, t) 464 and 466. In one embodiment, each pixel packet represents payload information 420 in fixed-point representation. Examples of pixel attributes that may be included in a pixel packet with a pixel packet size of 20 bits for pixel attributes include: one Z.16 sixteen bit Z depth value; one 16 bit S/T texture coordinate and a 4 bit level of detail; a pair of color values, each with 8 bit precision; or packed 5555 ARGB color with five bits each in each ARGB variable.

Sideband information for a pixel packet may include the (x,y) location of a pixel. However, in one embodiment, a start span command is generated by raster stage 310 at an (x,y) origin where it starts to walk across a triangle along a scan line. The use of a start span command permits an (x,y) location to be omitted from pixel packets. The start span command informs other entities (e.g., data write stage 355 and data fetch stage 330) of an initial (x,y) location at the start of a scan line. The (x,y) position of other pixels along the scan line can be inferred by the number of pixels a given pixel is away from the origin. In one embodiment, data write stage 355 and data fetch stage 330 include local caches adapted to increment local counters and update an (x,y) location based on a calculation of the number of pixels that they encounter after the span start command.

Figure 5:
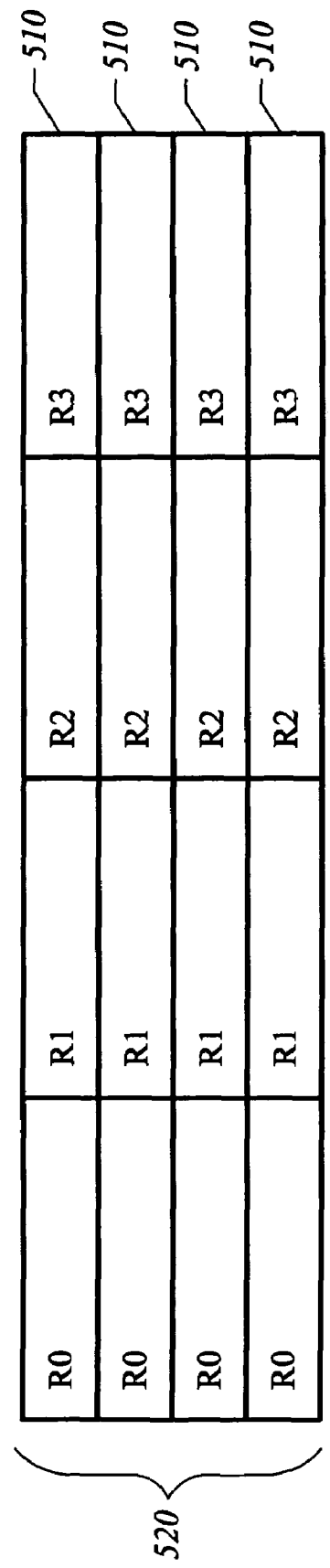
FIG. 5 illustrates an exemplary arrangement of pixel packets into rows of a group of pixel packets in accordance with one embodiment of the present invention.

Referring to FIG. 5, in one embodiment, raster stage 310 generates at least one row 510 of pixel packets for each pixel that is to be processed. In some embodiments, each row 510 has common sideband information 410 defining an instruction sequence for the row 510. If more than one row 510 is required for a pixel, the rows 510 are organized as a group 520 of rows that are processed in succession with each new clock cycle. In one embodiment, 80 bit pixel data is partitioned into four 20 bit pixel attribute register values, with the four pixel register values defining a "row" 510 of a pixel packet (R0, R1, R2, and R3) for a pixel.

An iterator register pool (not shown) of raster stage 310 has corresponding registers to support the rows 510 of pixel packets. In one implementation, raster stage 310 includes a register pool supporting up to 4 rows of pixel packets. Some types of pixel packet attributes, such as texture, may require a high precision. Conversely, some types of pixel packet attributes may require less precision, such as colors. The register pool can be arranged to support high precision and low precision values for each pixel packet in a row 510. In one embodiment the register pool includes 4 high precision and 4 low precision perspective correct iterated values per row, plus Z depth values. This permits, for example, software to assign the precision of the iterator for processing a particular pixel packet attribute. In one embodiment, raster stage 310 includes a register pool adapted to keep track of an integer portion of texture, permitting fractional bits of texture to be sent as data packets.

Raster stage 310 may, for example, receive instructions from the host that require an operation to be performed on a pixel. In response, raster stage 310 generates one or more rows 510 of pixel packets having associated instruction sequences, with the pixel packet rows and instructions arranged to perform the desired processing operation. As described below in more detail, in one embodiment ALU stage 340 permits scalar arithmetic operations to be performed in which the operands include a pre-selected subset of pixel attributes within a row 510 of pixel packets, constant values, and temporarily stored results of previous calculations on pixel packets.

A variety of graphics operations can be formulated as one or more scalar arithmetic operations. Additionally, a variety of vector graphics operations can be formulated as a plurality of scalar arithmetic operations. Thus, it will be understood that the programmable graphics processor 205 of the present invention may be programmed to perform any graphics operation on a pixel that can be expressed as a sequence of scalar arithmetic operations, such as a fog operation, color (alpha) blending, texture combine, alpha test, or depth test, such as those described in the *Open GL® Graphics System: A Specification* (*Version* 1.2), the contents of which are hereby incorporated by reference. For example, in response to raster stage 310 detecting a desired graphics processing function to be performed on a pixel (e.g., a fog operation), raster stage 310 may use a programmable mapping table or mapping algorithm to determine an assignment of pixel packets and associated instructions for performing scalar arithmetic operations required to implement the graphics function on a pixel. The mapping may, for example, be programmed by graphics processor management application 280.

Returning again to FIG. 3, as each pixel of a triangle is walked by raster stage 310, raster stage 310 generates pixel packets for further processing which are received by gatekeeper stage 320. Gatekeeper stage 320 performs a data flow control function. In one embodiment, gatekeeper stage 320 has an associated scoreboard 325 for scheduling, load balancing, resource allocation, and hazard avoidance of pixel packets. Scoreboard 325 tracks the entry and retirement of pixels. Pixel packets entering gatekeeper stage 320 set the scoreboard and the scoreboard is reset as the pixel packets drain out of programmable processor 205 after completion of processing. As an illustrative example, if a compact display 295 has an area of 128 by 32 pixels, scoreboard 325 may maintain a table for each pixel of the display to monitor pixels.

Scoreboard 325 provides several benefits. For example, scoreboard 325 prevents a hazard where one pixel in a triangle is on top of another pixel being processed and in flight. In one embodiment, scoreboard 325 monitors idle conditions and clocks off idle units using scoreboarding information. For example, if there are no valid pixels, scoreboard 325 may turn off the ALUs to save power. As described below in more detail, the scoreboard 325 tracks pixel packets that are capable of being processed by ALUs 350 along with those having a kill bit set such that the pixel packet flows through ALUs 350 without active processing. In one embodiment, scoreboard 325 tracks (x,y) positions of recirculated pixel packets. If a pixel packet is recirculated, scoreboard 325 increments the instruction sequence in the pixel packet in a subsequent pass to the next instruction for the pixel, e.g., if the instruction is for a fog operation on pass number 1 the instruction is iterated to an alphablending operation on pass number 2.

A data fetch stage 330 fetches data for pixel packets passed on by gatekeeper 320. This may include, for example, fetching color, depth, and texture data by performing appropriate color, depth, or texture data reads for each row of pixel packets. The data fetch stage 330 may, for example, fetch pixel or texel data by requesting a read from a memory interface (e.g., reading a frame buffer (not shown) using DMA engine 230). In one embodiment, data fetch stage 330 may also manage a local cache, such as a texture/fog cache 332, a color/depth cache 334, and a Z cache for depth data (not shown). Data that is fetched is placed onto a corresponding pixel packet field prior to sending the pixel packet on to the next stage. In one embodiment, data fetch stage 330 includes an instruction random access memory (RAM) with instructions for accessing data required by the pixel packet attribute fields. In some embodiments, data fetch stage 330 also performs a Z depth test. In this embodiment, data fetch stage 330 compares the Z depth value of a pixel packet to stored Z values using one or more depth comparison tests. If the Z depth value of the pixel indicates that the pixel is occluded, the kill bit is set.

The row of pixel packets enters an arithmetic logic unit (ALU) stage 340 for processing. ALU stage 340 has a set of ALUs 350 including at least one ALU 350, such as ALUs 350-0, 350-1, 350-2, and 350-3. While four ALUs 350 are illustrated, more or less ALUs 350 may be used in ALU stage 340 depending upon the application. An individual ALU 350 reads the current instruction for at least one row of a pixel packet 510 and implements any instruction to perform a scalar arithmetic operation that it is programmed to support. Instructions are included in each ALU 350 and may, for example, be stored on a local instruction RAM (not shown in FIG. 3).

Each ALU 350 includes instructions for performing at least one arithmetic operation on a first product of operands (a*b) and a second product of operands (b*c) where a, b, c, and d are operands and * is a multiplication. Some or all of the operands may correspond, for example, to register value attributes within a row 510 of a pixel packet. An ALU 350 may also have one or more operand values that are constant or software loadable. In some embodiments, an ALU may support using temporarily stored results from previous operations on pixel packets.

In one embodiment, each ALU 350 is programmable. A crossbar (not shown) or other programmable selector may be included within an ALU 350 to permit the operands and the destination of a result to be selected in response to an instruction from software (e.g. software application 270). For example, in one embodiment, an operation command code may be used to select the source of each operand (a, b, c, d) from attributes of any register value within a row 510 of pixel packets, temporary values, and constant values. In this embodiment, the operation command also instructs an ALU 350 where to send the result of the arithmetic operation, such as updating a pixel packet with the result, saving the result as a temporary value, or both updating a pixel packet with the result and saving the result as a temporary value. Thus, for example, an ALU can be programmed to read specific attributes within a pixel packet as operands and apply the scalar arithmetic operation indicated by the current instruction. The operation command code can also include commands to complement operands (e.g., calculate 1−x, where x is the read value), negate operands (e.g., calculate −x, where x is the read value), or clamp an operand or a result. Other examples of operation command codes may include, for example, a command to select a data format.

An example of an arithmetic operation performed by an ALU 350 is a scalar arithmetic operation of the form (a*b)+(c*d) on at least one variable within a pixel packet where a, b, c, and c are operands and the * operation is a multiplication. Each ALU 350 preferably also may be programmed to perform other mathematical operations such as complementing operands and negating operands. Additionally, in some embodiments, each ALU 350 may calculate minimum and maximum values from (a*b, c*d), and perform logical comparisons (e.g., a logical result if a*b is equal to, not equal to, less than, or less than or equal to c*d).

In some embodiments, each ALU 350 may also include instructions for determining whether to generate a kill bit in kill field 414 based on a test, such as a comparison of a*b and c*d (e.g., kill if a*b not equal to c*d, kill if a*b is equal to c*d, kill if a*b less than c*d, or kill if a*b is greater than or equal to c*d). Examples of ALU operations that may generate a kill bit include an alpha test in which a color value is compared to a test color value, such as the expression IF (alpha>alpha reference), then kill the pixel, where alpha is a color value, and alpha reference is a reference color value. Another example of an ALU operation that may generate a kill bit is a Z depth test where the Z value of a pixel is compared to at least one Z value of a previous pixel having the same location and the pixel is killed if the depth test indicates that the pixel is occluded.

In one embodiment, an individual ALU 350 is disabled in regards to processing a pixel packet if the kill bit is set in a pixel packet. In one embodiment, a clock gating mechanism is used to disable ALU 350 when a kill bit is detected in the sideband information. As a result, after a kill bit is generated for a pixel packet, the ALUs 350 do not waste power on the pixel packet as it propagates through ALU stage 340. However, note that a pixel packet with a kill bit set still propagates onwards, permitting it to be accounted for by data write stage 355 and scoreboard 325. This permits all pixel packets to be accounted for by scoreboard 325, even those pixel packets marked by a kill bit as requiring no further ALU processing. In one embodiment, if any row 510 of a pixel is marked by a kill bit, other rows 510 of the same pixel are also killed. This may be accomplished, for example, by forwarding kill information between stages or by one or more stages keeping track of pixels in which a row 510 is marked by a kill bit. In some embodiments, once a kill bit is set, only the sideband information 410 (which includes the kill bit) for a row 510 of pixel packets propagates on to the next stage.

The output of ALU stage 340 goes to data write stage 355. The data write stage 355 converts processed pixel packets into pixel data and writes the result to a memory interface (e.g., via DMA engine 230). In one embodiment, write values for a pixel are accumulated in write buffer 352 and the accumulated writes for a pixel are written to memory in a batch. Examples of functions that data write stage 355 may perform include color and depth writeback, and format conversion. In some embodiments, data write stage 355 may also identify pixels to be killed and set the kill bit.

A recirculation path 360 is included to recirculate pixel packets back to gatekeeper 320. Recirculation path 360 permits, for example, processes requiring a sequence of arithmetic operations to be performed using more than one pass through ALU stage 340. Data write stage 355 indicates retired writes to gatekeeper stage 320 for scoreboarding.

Figure 6:
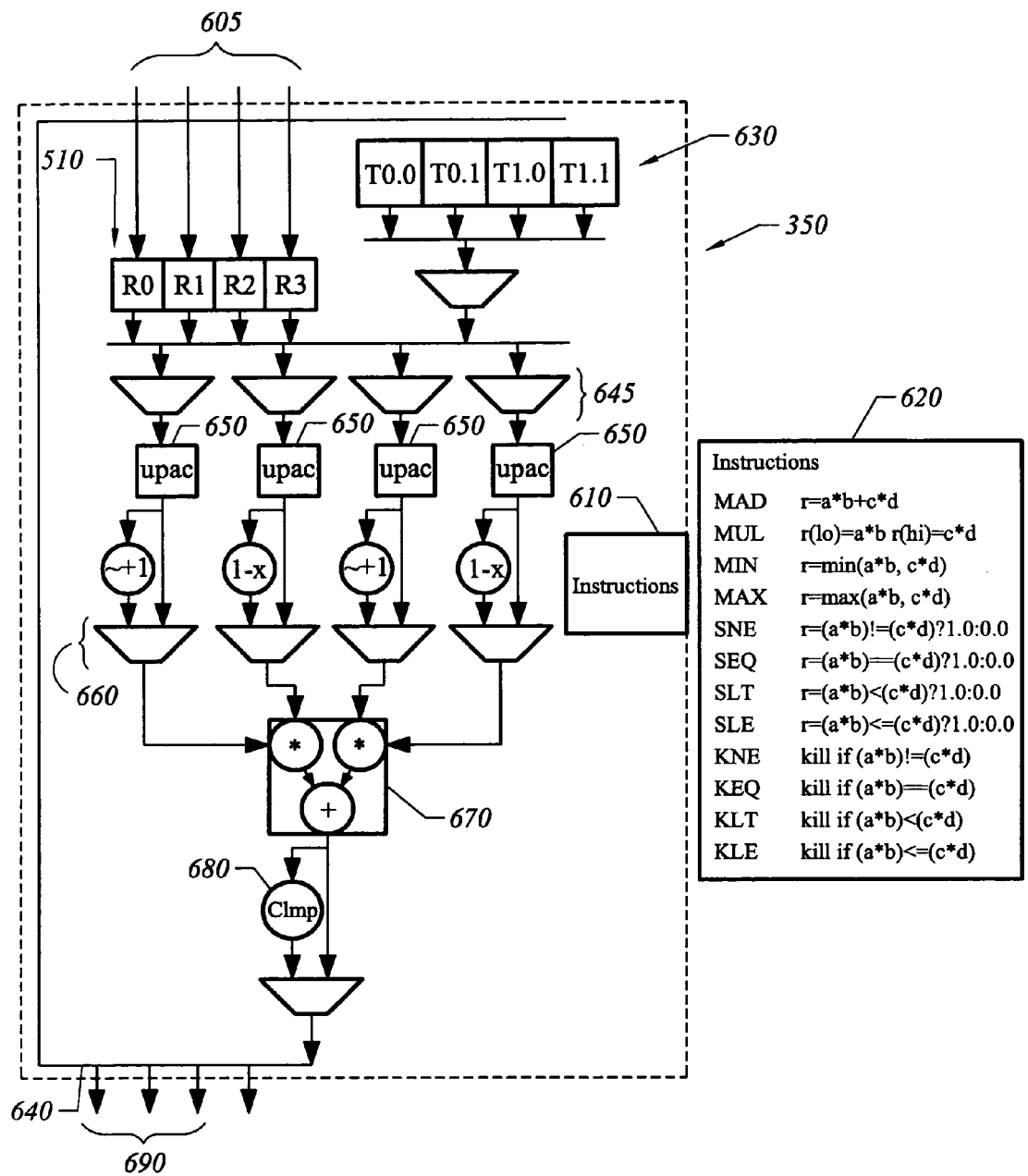
FIG. 6 is a block diagram of a single Arithmetic Logic Unit in accordance with one embodiment of the present invention.

FIG. 6 is a block diagram of an exemplary individual ALU 350. ALU 350 has an input bus 605 with data buses for receiving a row 510 of a pixel packets in corresponding registers R0, R1, R2, and R3. An instruction RAM 610 is included for ALU instructions. An exemplary set of instructions is illustrated in block 620. In one embodiment, ALU 350 may be programmed to read any one of the four 20 bit register values from a row 510 and select a set of operands from row 510. Additionally, ALU 350 may be programmed to select as operands temporary values from registers (T) 630, such as two 20 bit temporary values per ALU 350, which are temporarily saved from a previous result, as indicated by path 640. ALU 350 may also select as operands constant values (not shown), which may also be programmed by software. In one embodiment, a first stage of multiplexers (MUXs) 645 selects operands from the row of pixel packets, any temporary values 630, and any constant values (not shown). Format conversion modules 650 may be included to convert the operands into a desired data format suitable for the ALU's 350 computational precision in the arithmetic computation unit 670. ALU 350 includes elements to permit each operand or its complement to be selected in a second stage of MUXs 660. The resulting four operands are input to a scalar arithmetic computation unit 670 that can perform two multiplications and an addition. The resultant value may be optionally clamped to a desired range (e.g., 0 to 1.0) using a damper 680. The row 510 of pixel packets exits on buses 690.

In one embodiment, selected pixel packet attributes may be in a one sign 1.8 (S1.8) format. The S1.8 format is a base 2 number with an 8 bit fraction that is in the range of [−2 to +2). The S1.8 format permits a higher dynamic range for calculations. For example, in calculations dealing with lighting, the S1.8 format permits increased dynamic range, resulting in improved realism. If a result of a scalar arithmetic operation performed in S1.8 must be in the range of [0,1], the result may be clamped to force the result into the range [0,1]. As an illustrative example, a shading calculation for color data may be performed in the S1.8 format and the result then clamped. Note that in embodiments of the present invention that different types of pixel packets may have data attributes represented in different formats. For example color data may be represented in a first type of pixel packet in S1.8 format whereas (s,t) texture data may be represented in a second type of pixel packet by a high precision 16 bit format. In some embodiments, the pixel packet bit size is set by the bit size requirement of the highest precision pixel attributes. For example, since texture attributes typically require greater precision than color, the pixel packet size may be set to represent texture data with a high level of precision, such as 16 bit texture data. The improved dynamic range of the S1.8 format permits, for example, efficient packing of data for more than one color component into a 20 bit pixel packet size selected for higher precision data texture data requiring, for example, 16 bits for texture data and a 4 bit level of detail (LOD). For example, since each S1.8 color component requires ten bits, two color components may be packed into a 20 bit pixel packet.

Figure 7:
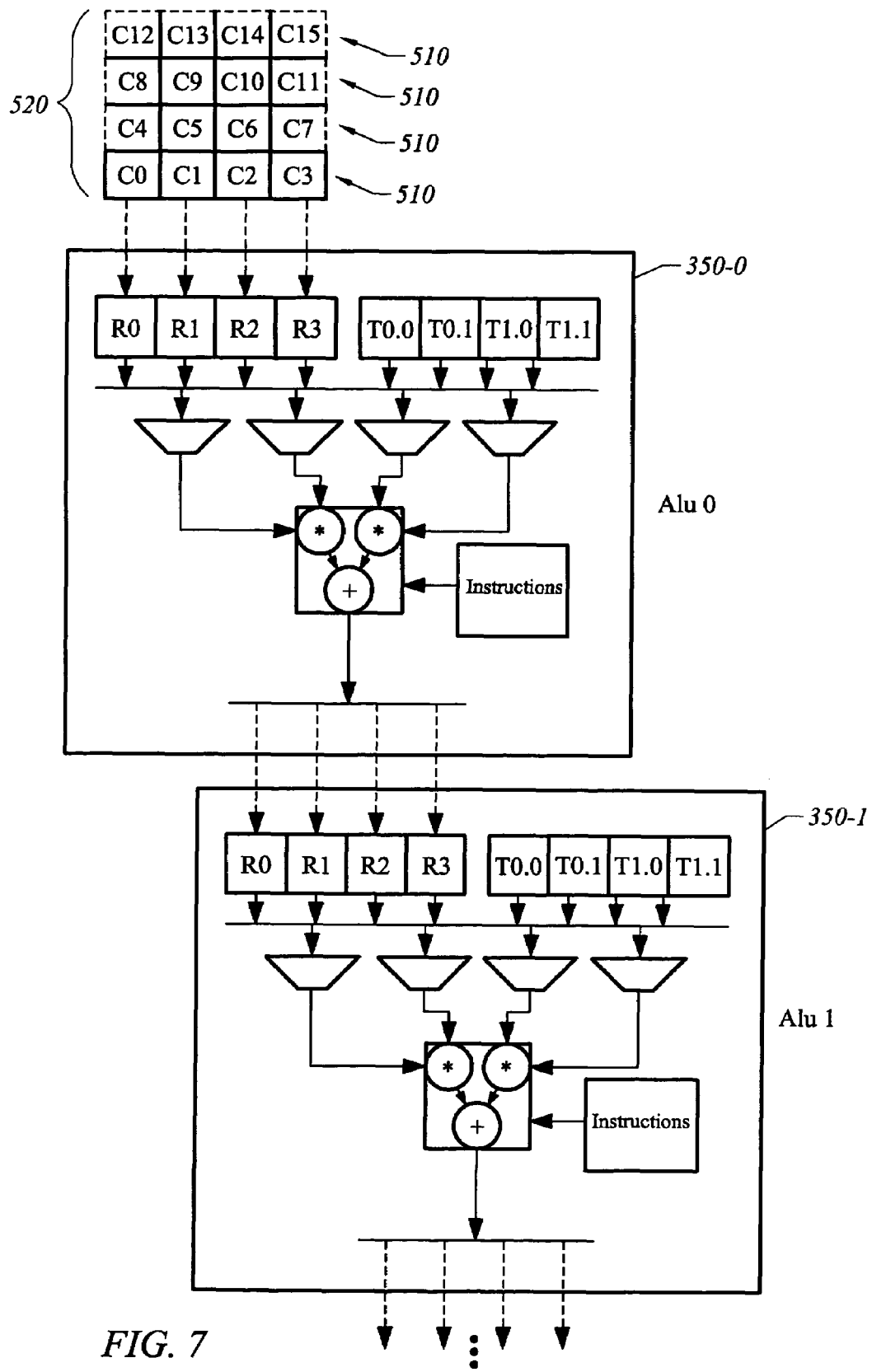
FIG. 7 is a block diagram of a sequence of two Arithmetic Logic Units in accordance with one embodiment of the present invention.

FIG. 7 illustrates an exemplary ALU stage 340 that includes more than one ALU 350 arranged as a pipeline in which two or more ALU 350s are chained together. As previously described, an individual ALU 350 may be programmed to read one or more operands from a pixel packet, generate a result of an arithmetic operation, and update either a pixel packet or a temporary register with the result. Each ALU may be assigned to read operands, generate arithmetic results, and update one or more pixel packets or temporary values before passing on a row of pixel packets to the next ALU.

The flow of data between ALUs 350 in ALU stage 340 may be configured in a variety of ways depending upon the processing operations to be performed, ALU latency, and efficiency considerations. As previously described, the present invention permits each ALU to be programmed to read selected operands within a row of pixel packets and update a selected pixel packet register with a result. In one embodiment, ALU stage 340 includes at least one ALU 350 for each color channel (e.g., red, green, blue, and alpha). This permits, for example, load balancing in which the ALUs are configured to operate in parallel upon a row of pixel packets 510 (though at different points in time due to pipelining) to perform similar or different processing tasks. As one example of how ALUs 350 may be programmed, a first ALU 350-0 may be programmed to perform calculations for a first color component, a second ALU 350-1 may be programmed to perform operations for a second color component, a third ALU 350-2 may be programmed to perform operations for a third color component, and a fourth ALU 350-3 may be programmed to perform a fog operation. Thus, in some embodiments each ALU 350 may be assigned different processing tasks for a row of pixel packets 510. Additionally, as described below in more detail, in some embodiments software may configure the ALUs 350 to select a data flow of ALUs 350 within ALU stage 340, including an execution order of the ALUs 350. However, since the data flow may be configured, it will be understood that in some embodiments the data flow along a chain of ALUs may be arranged so that the results of one ALU 350-0 update one or more pixel packet registers which are read as operands by a subsequent ALU 350-1.

Figure 8:
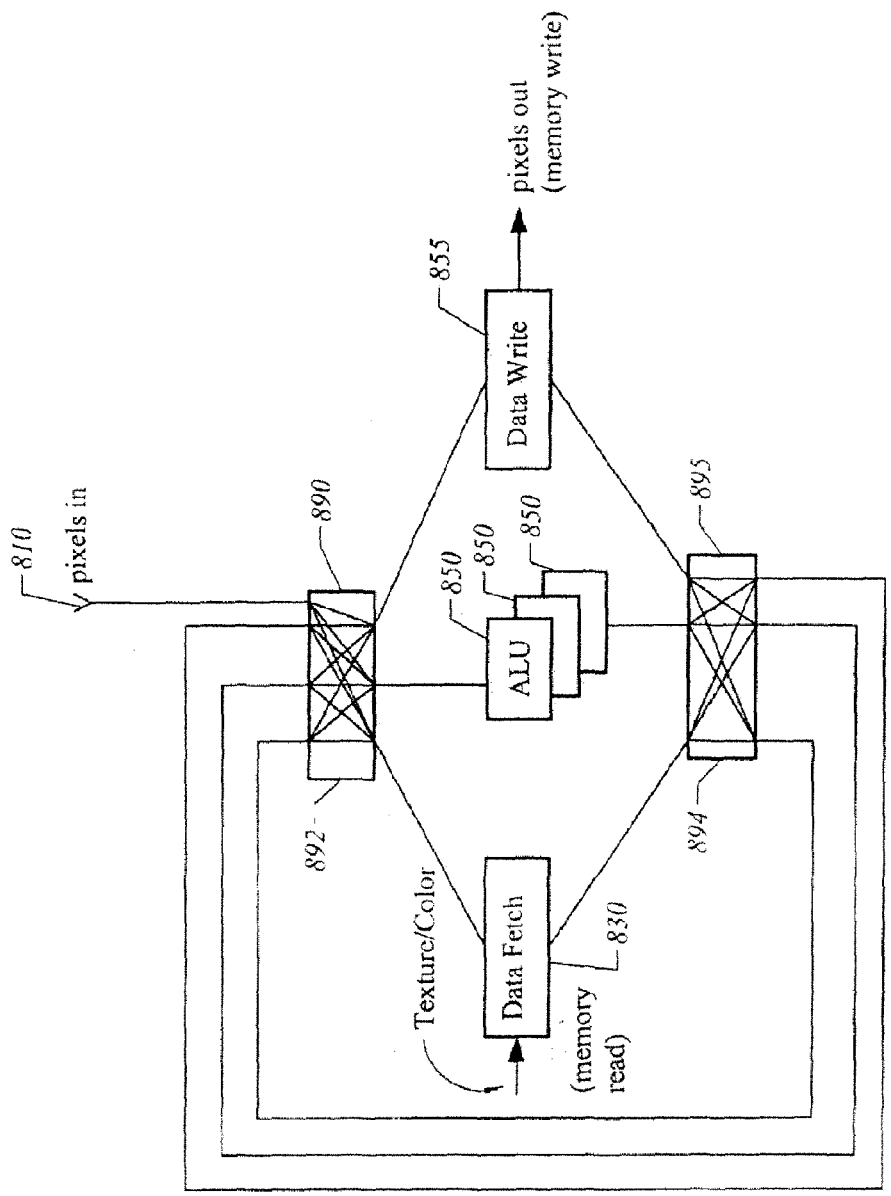
FIG. 8 is a block diagram of a configurable programmable graphics processor in accordance with one embodiment of the present invention.

FIG. 8 is a block diagram of an embodiment of a portion of a programmable graphics processor 205 having a reconfigurable pipeline in which the process flow of pixel packets through the stages is configurable in response to software commands, such as software commands from graphics processor management application 280. Distributors 890 and 895 coupled to respective inputs and outputs of elements of the stages permit the process flow of pixel packets to be reconfigured. The stages may include, for example, a data fetch stage 830, a data write stage 855, and individual ALU's 850, although it will be understood that other types of stages may also be reconfigured using distributors 890 and 895. In some embodiments software may dynamically reconfigure the process flow of pixel packets through the stages. A synchronization technique is thus preferably utilized to coordinate the data flow of pixel packets that are in flight during the change over from one configuration to another, i.e., performing a synchronization such that pixel packets in flight that are intended to be processed in a first configuration complete their processing before the configuration is changed to a second configuration.

In one embodiment, data fetch stage 830, data write stage 855, and individual ALU's 850 have respective inputs each connected to first distributor 890 and respective outputs each connected to second distributor 895. Each distributor 890 and 895 may, for example, comprise switches, crossbars, routers, or a MUX circuit to select a distribution flow of incoming pixel packets to data fetch stage 830, ALUs 850, and data write stage 855. The distributors 890 and 895 determine the data path of incoming pixel packets 810 through data fetch stage 830, data write stage 855, and individual ALUs 850. Signal inputs 892 and 894 permit distributors 890 and 895 to receive software commands (e.g., from a software application running on a CPU) to reconfigure the distribution of pixel packets between the data fetch stage 830, data write stage 855, and ALUs 850. One example of a reconfiguration is assigning an execution order of the ALUs 850. Another example of a reconfiguration is bypassing data fetch stage 830 if it is determined that the data fetch stage is not required for a certain time processing task. As still another example of reconfiguration, it may be desirable to change the order in which data fetch stage 830 is coupled to ALUs. As another example, it may be desirable to reorder the data write stage 855. As an illustrative example, there may be instances where it is more efficient to operate on a texture coordinate prior to a data fetch, in which case the data flow is arranged to have data fetch stage 830 receive pixel packets after the ALU 850 performs the texture operation. Thus, one benefit of a reconfigurable pipeline is that a software application can reconfigure the programmable graphics processor 205 to increase efficiency.

Referring again to FIG. 5, as previously discussed raster stage 310 generates rows 510 of pixel packets for processing. The rows 510 may be further arranged into a group 520 of rows, such as a sequence of four rows 510, that are passed on for processing in successive clock cycles. However, some operations that can be performed on a row 510 of pixel packets may require the result of an arithmetic operation of another row of pixel packets. Consequently, in one embodiment raster stage 310 arranges pixel packets in a group 520 of rows to account for data dependencies. As an illustrative example, if a texture operation on one pixel packet requires the result of another pixel packet in one row, the group 520 is arranged so that the pixel packet having the dependent texture operation is placed in a later row.

Figure 9:
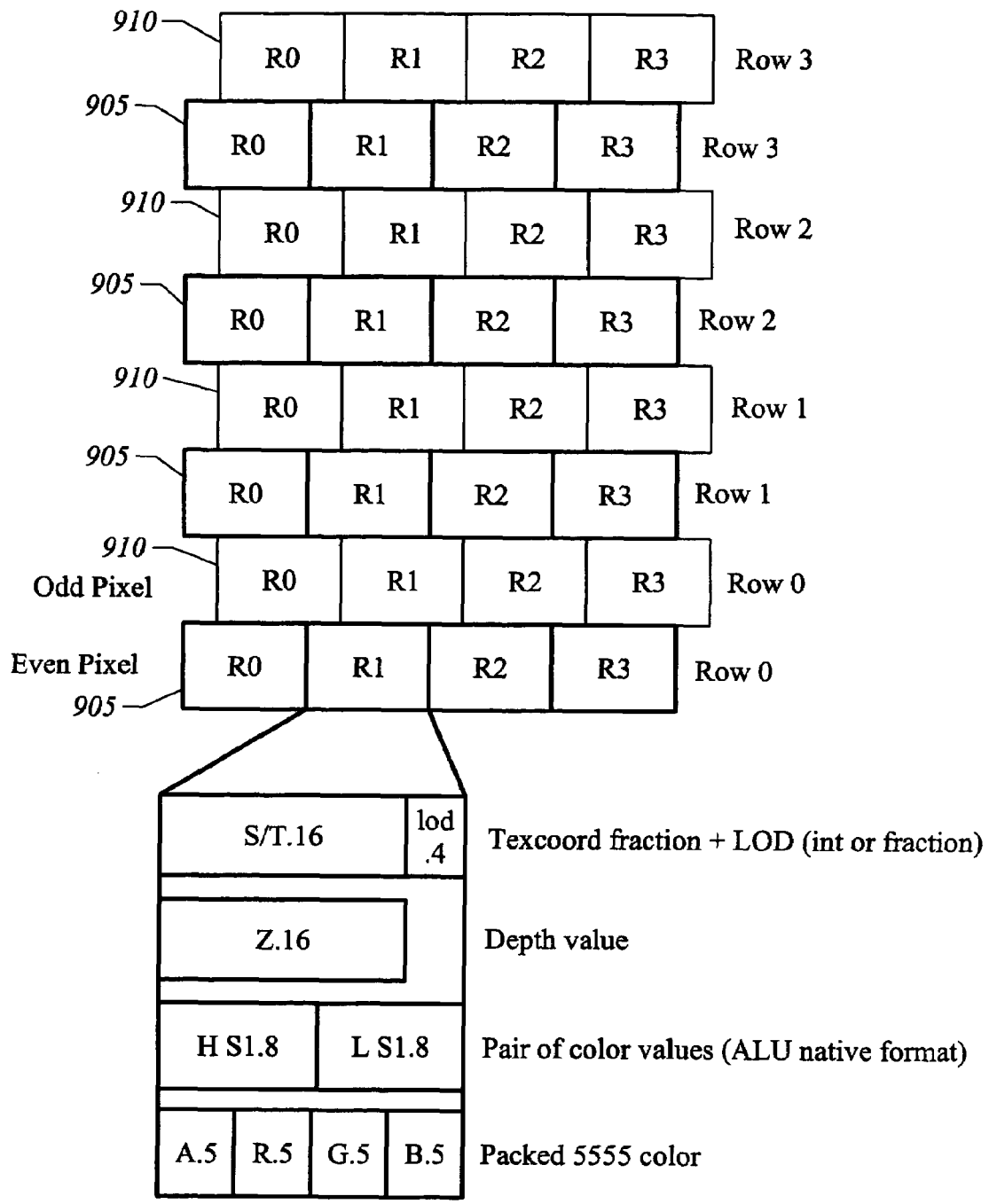
FIG. 9 illustrates interleaving of rows of pixel packets in accordance with one embodiment of the present invention.

Referring to FIG. 9, in one embodiment, pixels are alternately assigned by raster stage 310 as either odd or even. Corresponding registers (R0, R1, R2, and R3) for each row of a pixel are correspondingly assigned as even or odd. Even rows 905 of pixel packets for even pixels and odd rows 910 for odd pixels are then interleaved utilizing one or more rules to avoid data dependencies. Interleaving every other row provides an additional clock cycle to account for ALU latency. Thus, if Row 0 for the even pixel requires two clock cycles to generate a resultant required by Row 1 of the even pixel, the interleaving of Row 0 for the odd pixel provides the additional clock cycle of time required by the ALU latency. As an illustrative example consider a multitexture operation where Row 0 for the even pixel is a blending operation and Row 1 for the same pixel corresponds to a blend with a second texture requiring the result of the first blending operation. If the ALU latency for the first operation is two clock cycles, then interleaving permits the results of the blending operation to be available for the texture with blend operation.

In an interleaved embodiment, sideband information is preferably included to coordinate the interleaved data flow.

For example, in one embodiment sideband information in each pixel packet includes an even/odd field to distinguish even and odd rows. Each ALU 350 may also include two sets of temporary registers corresponding to temporary registers for even pixels and odd pixels to provide an appropriate temporary value for even/odd pixel packets. The even/odd field is use to select the appropriate set of temporary registers, e.g., even temporary registers are selected for even pixels whereas an odd set of temporary registers are selected for odd pixels. In one embodiment, constant registers are shared by both even and odd pixels to reduce the total amount of storage needs for constant values used for both even and odd pixels. In one embodiment, the software host may set the temporary registers at a constant value for an extended period of time to emulate constant registers. While an interleaving of two pixels is one implementation, it will be understood that the interleaving may be further extended to interleave more than two pixels if, for example, ALU latency corresponds to more than two clock cycles. One benefit of having raster stage 310 interleave pixel packets is that ALU latency is taken into account by hardware, reducing the burden on software to account for ALU latency that would otherwise occur if, for example, raster stage 310 did not interleave pixels.

As previously discussed, in a configurable pipeline, the data flow within the ALU 350s may be configured. For example, in hardware, each ALU 350 may be substantially identical. However, a particular ALU may be configured to have more than one place in the data flow, e.g., a different execution order. Consequently, an identifier needs to be provided in each ALU 350 to indicate its place within the data flow. The identifier may, for example, be provided to each ALU 350 by a direct register write of each ALU 350. However, this approach has the disadvantage of requiring significant software overhead. Consequently, in one embodiment a packet technique is utilized to trigger elements requiring configuration information to discover their relative location within the process flow and write a corresponding identifier in a local register.

Figure 10:
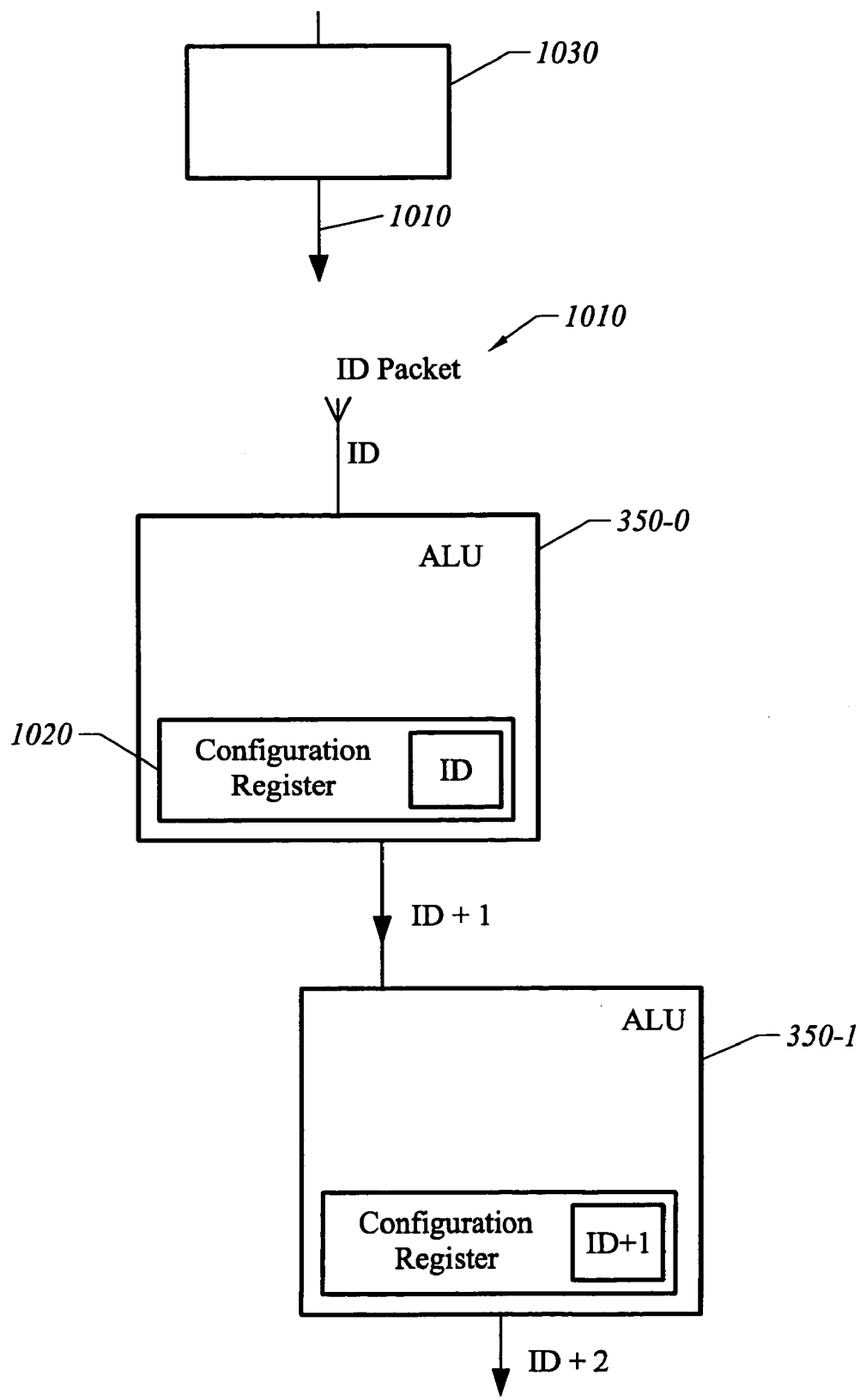
FIG. 10 is a block diagram illustrating Arithmetic Logic Units having configuration registers in accordance with one embodiment of the present invention.

Referring to FIG. 10, in one embodiment the register address space of the ALUs 350 is software configurable using a packet initialization technique to communicate an identification (ID) to each ALU 350 using data packets. Each ALU 350 may, for example, include conventional network modules for receiving and forwarding data packets. In one embodiment, an ID packet 1010 is initiated by a software application. The ID packet 1010 contains an initial ID code, such as a number. The ID packet 1010 is injected in the graphics pipeline at a point before elements requiring an ID code and then is passed on to subsequent elements of the process flow defined by the current pipeline configuration. In one embodiment, a configuration register 1020 in a first ALU 350 receives the ID packet, writes the current value of the ID code into the configuration register and then increments the ID code of the ID packet before passing the ID packet onto the next ALU. This process is continued, with each subsequent ALU 350 writing the current value of the ID code into its configuration register, and then passing on the ID packet with an incremented ID code to the next ALU. It will be understood that other stages along the data flow path may also have configuration registers set in a similar manner. For example, the elements in a configuration flow may also include a data fetch stage or a data write stage that also have configuration registers set by reading an ID packet and which increment the ID code before passing the ID packet with the increment ID to the next element in the configuration flow. One benefit of this form of register configuration is that it requires no hardware differences between ALU 350 units, permitting software reconfiguration of the data flow through the pipeline. Thus for example, in one embodiment graphics processor management application 280 needs only generate an initial ID packet 1010, such as by issuing a command to generate an ID packet 1010 via host interface 220 that is received by an ID packet generator 1030.

In an alternate embodiment, ID codes are written into the configuration registers using a broadcast packet technique to trigger elements requiring configuration registers to be written to discover their ID. In this embodiment, the elements (e.g., ALUs 350) may use a network protocol to discover their ID. A broadcast packet technique is useful, for example, in embodiments in which a pipeline is branched to permit branches of the pipeline to process pixels in parallel.

Figure 11:
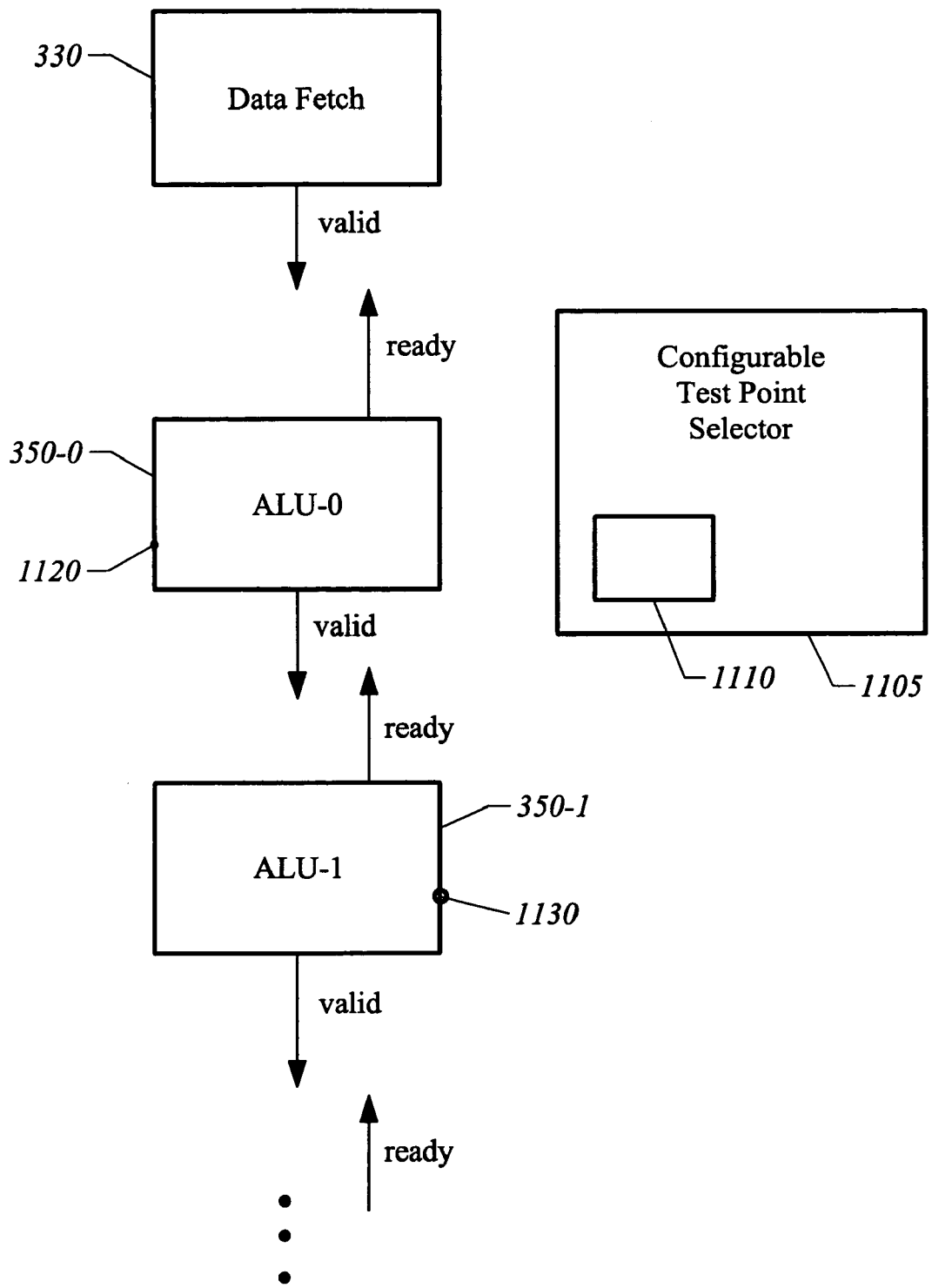
FIG. 11 is a block diagram illustrating a configurable test point selector in accordance with one embodiment of the present invention.

FIG. 11 illustrates an embodiment that includes a diagnostic monitoring capability. In one embodiment, there is a sequence of taps along elements of graphics processor 205, such as taps associated with each ALU 350 and data fetch stage 330. Taps may also be included at other stages as well. A configurable test point selector 1105 is adapted to permit selected taps, such as two taps 1120 and 1130, to be monitored in response to a software command, such as a software command from graphics processor management application 280. Configurable test point selector 1105 may, for example, be implemented using multiplexers. In one embodiment, at least one counter 1110 is included for statistics collection of each selected test point. In one embodiment, an instrumentation packet generated by software provides information on the taps to be monitored and enables counting for the selected test points. Additionally, an instrument register may be included to gate statistics collection on and off based on the operational mode of the pipeline (e.g., an instrument register may be provide to permit software to enable counting for specific types of graphics operations, such as enabling statistical counting when alphablending operations occur). One benefit of configurable test point selector 1105 is that it permits software, such as graphics processor management application 280, to have statistical data collected for only test points of interest, reducing the hardware complexity and cost while still allowing software to analyze any portion of the behavior of programmable processor 205. The test points of interest may, for example be selected to collect statistics associated with those ALUs 350 processing specific kinds of data, such as ALUs 350 processing texture data. Additionally, the statistics collection may be enabled for specific graphics operations, such as alphablending.

In one embodiment, configurable test point selector 1105 utilizes a three-wire protocol. Each element, such as an ALU 350-0, that has valid payload data generates a valid signal, which may, for example flow down to the next element (e.g., ALU 350-1). An element that is ready to receive a payload generates a ready signal, which may, for example, flow up to the previous element. However, if an element is not ready to receive a payload, the element generates a not ready signal, which may, for example correspond to not asserting the ready signal. An enable signal corresponds to an element being enabled for monitoring, such as by software control via a pipelined register write to a monitoring enable control bit stored adjacent to the point being monitored. The signal may be tapped off directly from an element generating the signal or from elements receiving these signals.

The valid, ready, and not-ready signals at selected tap points can be used to determine an operating state. A transfer state corresponds to a clock tick having a valid payload (i.e., the valid bit set) for data flowing downstream and a ready signal from a downstream block in the downstream block to receive the data (e.g., at tap point 1120, a valid signal from ALU0 and a ready signal from ALU-1 at tap point 1130). A wait state corresponds to a clock tick with a valid payload that is blocked because the block below is not ready to receive data (e.g., at tap point 1120, a valid signal from ALU-0 and a not ready signal from ALU-1 at tap point 1130). In this embodiment, statistics on selected tap points may be collected, such as counting the number of clock cycles that a transfer state and a wait state are detected.

Embodiments of the present invention provide a variety of benefits that are useful in an embedded graphics processor core 250. In a system that is a compact, low power handheld system 290, power, space, and CPU capabilities may be comparatively limited. In one embodiment, ALU's 350 are clock gated when processing is not required (e.g., by detecting a kill bit), reducing processing power requirements. Additionally, the raster stage 310 needs only generate pixel packets for the subset of pixel data that is processed, also reducing power requirements. The programmable ALU stage 340 requires a smaller chip area than a conventional pipeline with dedicated stages for performing a dedicated graphics function, reducing cost. The programmable processor 205 may be implemented as blocks that are configurable by software, providing improved efficiency. Test monitoring may be configured to test a subset of test points, reducing bandwidth and analysis requirements by software. These and other previously described features make the programmable graphics processor 205 of interest for use in an embedded graphics processor core 250.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A graphics processor, comprising:
a raster stage receiving data on primitives to be rasterized, said raster stage generating a plurality of pixel packets for each pixel to be processed, each pixel packet including payload information identifying at least one pixel attribute to be processed and having associated sideband information identifying at least one instruction to be executed on each said pixel packet;
a programmable Arithmetic Logic Unit (ALU) stage for processing said pixel packets, said ALU stage including a plurality of ALUs, each ALU having a set of at least one possible arithmetic operation that is performed on an incoming pixel packet having a corresponding current instruction command;
a data fetch stage to fetch data for said pixel packets;
a data write stage to perform a memory write of pixel data of processed pixel packets received from said ALU stage;
a first distributor coupled to respective inputs of said ALU stage, said data fetch stage, and said data write stage; and
a second distributor coupled to respective outputs of said ALU stage, said data fetch stage, and said data write stage;
said first distributor and said second distributor adapted for reconfiguring a process flow of pixel packets through said data fetch stage, said ALU stage, and said ALU write stage in response to a command from a host.

2. The graphics processor of claim 1, wherein said first distributor and said second distributor are adapted to permit at least one portion of said graphics processor to be bypassed in response to a software command.

3. The graphics processor of claim 2, wherein said first distributor and said second distributor are adapted to permit said data fetch stage to be bypassed in response to a software command.

4. The graphics processor of claim 1, wherein said first distributor and said second distributor are coupled to each ALU in said ALU stage to permit an ALU execution order to be assigned in response to a software command.

5. The graphics processor of claim 1, wherein said graphics processor is adapted to permit said host to reconfigure said process flow to have a data fetch after a scalar arithmetic operation.

6. The graphics processor of claim 1, wherein said graphics processor is adapted to permit said host to reconfigure said process flow to have a data fetch before a scalar arithmetic operation.

* * * * *